J. Christman.
Well Tubing.
No. 51,145.  Patented Nov. 28, 1865.
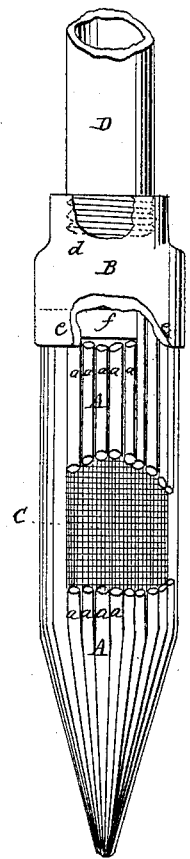
Witnesses:
N. B. Smith
P. Doolittle
Inventor
John Christman

UNITED STATES PATENT OFFICE.

JOHN CHRISTMAN, OF SYRACUSE, NEW YORK.

IMPROVEMENT IN PUMP-FILTERS.

Specification forming part of Letters Patent No. 51,145, dated November 28, 1865.

*To all whom it may concern:*

Be it known that I, JOHN CHRISTMAN, of the city of Syracuse, New York, have invented a new and Improved Pump Filter; and I do hereby declare that the following is a full, clear, and exact description of the construction of the same, and the form thereof when complete, reference being had to the annexed drawing, making a part of this specifiation.

The letters used represent the same parts wherever they occur.

To enable others skilled in the art to make and use my invention, I will proceed to describe the construction of the filter, and its form when complete and ready for use.

I use any kind of common wire, and arrange sections thereof in a tubular form, A, so that the longitudinal sections *a a a a*, &c., will form an open grate. The ends of the wire sections designed for the lower part of the filter are welded together in a compact form, which may be round, pointed, or square across. The ends of the wire sections designed for the upper part of the filter are made to pass between two shoulders, *b* the inner one, and *c* the outer one, forming a part of the round head-piece B, thus keeping them in a circular or tubular form, and to hold the same firmly the outer shoulder, *c*, may be soldered down upon the wire sections, and the same thus held securely in their places. The head-piece will be of sufficient length so that the upper end thereof may receive the cut of a screw either on the inside or the outside, as may be desirable, as seen at *d*, to receive the pump-tube D. Fitting the inside of the wire tube thus formed I insert another tube, C, made of common wire-gauze, and the two thus formed make a strong and perfect filter to be used at the bottom of pump-tubes.

The tube of wire-gauze may, in case there is quicksand, be packed with charcoal or other filtering substances; but for ordinary use no such packing would be necessary.

What I claim as my invention, and desire to secure by Letters Patent, is—

A pump-filter composed of the parts A, B, and C, substantially as and for the purposes described.

JOHN CHRISTMAN.

Witnesses:
N. B. SMITH,
P. CORBETT.